(12) United States Patent
Hattori et al.

(10) Patent No.: US 8,947,984 B2
(45) Date of Patent: Feb. 3, 2015

(54) PARTICULATE MAGNETIC RECORDING MEDIUM AND MAGNETIC RECORDING DEVICE

(71) Applicant: FUJIFILM Corporation, Minato-ku, Tokyo (JP)

(72) Inventors: Yasushi Hattori, Minami-ashigara (JP); Hidehiro Mochizuki, Minami-ashigara (JP); Toshio Sasaki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/171,927

(22) Filed: Feb. 4, 2014

(65) Prior Publication Data

US 2014/0219069 A1 Aug. 7, 2014

(30) Foreign Application Priority Data

Feb. 5, 2013 (JP) .................. 2013-020679

(51) Int. Cl.
| | | |
|---|---|---|
| *G11B 11/00* | (2006.01) | |
| *G11B 5/73* | (2006.01) | |
| *G11B 13/04* | (2006.01) | |
| *G11B 5/706* | (2006.01) | |
| *G11B 5/738* | (2006.01) | |

(52) U.S. Cl.
CPC .............. *G11B 5/7305* (2013.01); *G11B 13/04* (2013.01); *G11B 5/70642* (2013.01); *G11B 5/738* (2013.01); *G11B 5/70678* (2013.01)
USPC ................. 369/13.14; 369/13.32; 369/13.41; 369/13.42

(58) Field of Classification Search
None
See application file for complete search history.

(56) References Cited

U.S. PATENT DOCUMENTS

| | | | | |
|---|---|---|---|---|
| 5,804,283 | A * | 9/1998 | Inaba et al. | .................. 428/141 |
| 7,781,082 | B2 | 8/2010 | Ohkoshi et al. | |
| 7,846,565 | B2 * | 12/2010 | Fullerton et al. | .............. 428/834 |
| 2008/0057352 | A1 | 3/2008 | Ohkoshi et al. | |

FOREIGN PATENT DOCUMENTS

| | | |
|---|---|---|
| JP | 2003-77115 A | 3/2003 |
| JP | 2008-60293 A | 3/2008 |

* cited by examiner

*Primary Examiner* — Muhammad N Edun
(74) *Attorney, Agent, or Firm* — Sughrue Mion, PLLC

(57) ABSTRACT

The magnetic recording medium is a particulate magnetic recording medium for heat-assisted recording, as well as includes a magnetic layer comprising ferromagnetic powder and binder on a nonmagnetic organic material support and a heat-diffusing layer of higher thermal conductivity than the magnetic layer between the nonmagnetic organic material support and the magnetic layer.

14 Claims, 1 Drawing Sheet

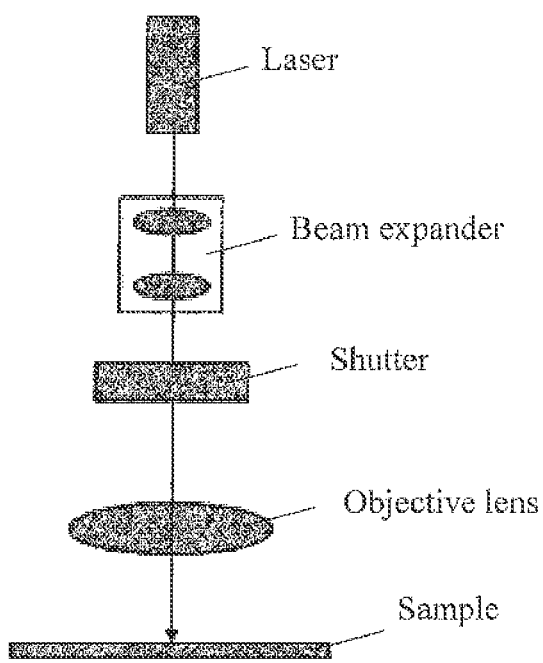

PARTICULATE MAGNETIC RECORDING MEDIUM AND MAGNETIC RECORDING DEVICE

CROSS-REFERENCE TO RELATED APPLICATIONS

This application claims the benefit of priority under 35 USC 119 to Japanese Patent Application No. 2013-020679 filed on Feb. 5, 2013, which is expressly incorporated herein by reference in its entirety.

BACKGROUND OF THE INVENTION

1. Field of the Invention

The present invention relates to a particulate magnetic recording medium, a magnetic recording device comprising the same, and a magnetic recording method employing the same. More particularly, the present invention relates to a particulate magnetic recording medium that can be applied to heat-assisted recording despite having poorer heat resistance than a hard disk drive (HDD), a magnetic recording device comprising the same, and a magnetic recording method employing the same.

2. Discussion of the Background

As the quantity of information being recorded has increased, constantly higher density recording has been demanded of magnetic recording media. A reduction in the particle size of magnetic material is required to achieve even higher density recording. However, when the size of the particles in the magnetic material is decreased, the energy (magnetic energy) maintaining the direction of magnetization of the magnetic material cannot readily counter the thermal energy, and so-called thermal fluctuation ends up compromising recording retention. The phenomenon where magnetic energy is overcome by thermal energy and the recording is erased can no longer be ignored.

This point will be described. "KuV/kT" is known as an index relating to the thermal stability of magnetization. Ku is the anisotropic constant of a magnetic material. V (also given as "Vact", hereinafter) is the particle volume (activation volume). The Boltzmann constant is denoted by k. T denotes the absolute temperature. The effect of thermal fluctuation can be inhibited by increasing the magnetic energy KuV relative to the thermal energy kT. However, it is better for the particle volume V—that is the particle size of the magnetic material— to be reduced to achieve higher density recording. Since the above magnetic energy is the product of Ku and V, it suffices to increase Ku to increase the magnetization energy when V is in the low range. However, the switching field of magnetic material with high magnetocrystalline anisotropy increases, resulting in high coercive force, and a large external magnetic field becomes necessary for recording, compromising recording properties. That is, the higher the Ku of the magnetic particles, the more difficult it becomes to write information.

As stated above, it is extremely difficult to achieve the three characteristics of higher density recording, thermal stability, and ease of writing. This is referred to as the magnetic recording trilemma, and is becoming a major issue in the pursuit of ever higher recording densities.

In recent years, in the field of hard disk drives (HDD), one means of resolving the trilemma has been proposed in the form of a recording system (heat-assisted recording) in which the recording portion of the magnetic layer is heated by the magnetic head to lower the coercive force Hc, ensuring ease of writing.

Japanese Unexamined Patent Publication (KOKAI) No. 2008-60293 or English language family member US2008/057352A1 and U.S. Pat. No. 7,781,082, which are expressly incorporated herein by reference in their entirety, discloses controlling the coercive force of the magnetic material through compositional adjustment without heat-assisted recording, in light of the practical difficulties associated with heat-assisted recording.

Additionally, Japanese Unexamined Patent Publication (KOKAI) No. 2003-77115, which is expressly incorporated herein by reference in its entirety, proposes applying heat-assisted recording to particulate magnetic recording media.

As set forth above, Japanese Unexamined Patent Publication (KOKAI) No. 2003-77115 proposes recording on particulate magnetic recording media by heat-assisted recording. However, in reality, it is currently considered impossible in this field for particulate magnetic recording media for heat-assisted recording to attain the level of practical use. That is because in a particulate magnetic recording medium, the support and various layers are comprised of organic materials with poorer thermal resistance than the materials constituting the HDD (inorganic materials, metal, glass, and the like). They are thus thought incapable of withstanding the heat during heat-assisted recording.

Since particulate magnetic recording media can afford better chemical stability than vapor deposition-type magnetic recording media such as HDDs, they are useful magnetic recording media for high-capacity data storage in the recording of information with high long-term reliability. Were it possible to apply heat-assisted recording to such useful particulate magnetic recording media, the trilemma could be resolved and even higher capacity and higher density recording could be achieved.

SUMMARY OF THE INVENTION

The present invention provides for means permitting the practical use of particulate magnetic recording media for heat-assisted recording.

Heat-assisted recording is a recording method in which the Hc of the magnetic layer is lowered by heating, ensuring ease of writing. Accordingly, the portion that is to be heated during heat-assisted recording is the magnetic layer. However, when the heat that is applied to the medium during heat-assisted recording may end up reaching portions beneath the magnetic layer, because such portions in a particulate magnetic recording medium are comprised of organic material with poor heat resistance, the medium may deform and running stability may be compromised.

The present inventors conducted extensive research. As a result, they discovered for the first time ever that by providing a heat-diffusing layer in the form of a layer of higher thermal conductivity than the magnetic layer between the nonmagnetic organic material support and the magnetic layer, it became possible to apply heat-assisted recording to a particulate magnetic recording medium. That is because the heat-diffusing layer could prevent the heat applied to the medium during heat-assisted recording from reaching the area beneath the magnetic layer.

The present invention was devised based on this knowledge.

An aspect of the present invention relates to a magnetic recording medium, which is a particulate magnetic recording medium for heat-assisted recording, as well as comprises a magnetic layer comprising ferromagnetic powder and binder on a nonmagnetic organic material support and a heat-diffusing layer of higher thermal conductivity than the magnetic layer between the nonmagnetic organic material support and the magnetic layer.

In an embodiment, the magnetic recording medium comprises a nonmagnetic layer comprising nonmagnetic powder and binder between the nonmagnetic organic material support and the heat-diffusing layer.

In an embodiment, the heat-diffusing layer is a layer comprising metal particles and binder.

In an embodiment, the binder in the magnetic layer has a glass transition temperature that is higher than that of the binder in the nonmagnetic layer.

In an embodiment, the binder in the nonmagnetic layer has a glass transition temperature that is lower than a temperature to which the magnetic layer is heated during heat-assisted recording.

In an embodiment, the binder in the nonmagnetic layer has a glass transition temperature of less than 100° C.

In an embodiment, the ferromagnetic powder is ferromagnetic ferrite powder.

In an embodiment, the ferromagnetic powder has a coercive force at 25° C. of equal to or greater than 318 kA/m, approximately equal to or greater than 4000 Oe.

In an embodiment, the ferromagnetic powder is $\epsilon$-iron oxide.

In an embodiment, the ferromagnetic powder exhibits a temperature dependency of a coercive force Hc of equal to or less than $(-796 \text{ A/m})/°$ C., approximately equal to or less than $-10$ Oe/° C.

A further aspect of the present invention relates to a magnetic recording device, comprising:
the above magnetic recording medium; and
a magnetic recording head for heat-assisted recording.

In an embodiment, the magnetic head for heat-assisted recording heats a recording portion on the magnetic layer of the above magnetic recording medium to equal to or higher than 100° C.

An aspect of the present invention can make it possible to apply a particulate magnetic recording medium that is useful as a medium for high-capacity data storage to heat-assisted recording that can contribute to overcoming the trilemma.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the FIGURE, wherein:

FIG. 1 is a descriptive schematic diagram of the optical system employed to heat the magnetic tapes in Examples.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

[Particulate Magnetic Recording Medium for Heat-Assisted Recording]

An aspect of the present invention relates to a particulate magnetic recording medium for heat-assisted recording (also referred to hereinafter simply as a "magnetic recording medium" or "particulate magnetic recording medium") having a magnetic layer comprising ferromagnetic powder and binder on a nonmagnetic organic material support, and having a heat-diffusing layer of higher thermal conductivity than the magnetic layer between the nonmagnetic organic material support and the magnetic layer. The magnetic recording medium according to an aspect of the present invention has a heat-diffusing layer, of higher thermal conductivity than the magnetic layer, between the nonmagnetic organic material support and the magnetic layer containing ferromagnetic powder and binder. By means of the heat-diffusing layer, the heat that is applied to the magnetic layer by the recording head during heat-assisted recording can be prevented from reaching the layer beneath magnetic layer. This is because the heat that is applied to the magnetic layer during heat-assisted recording can be diffused by the heat-diffusing layer, achieving the effect of a large decrease in temperature in the direction of depth. Accordingly, during heat-assisted recording, the layer beneath the magnetic layer—for example, a nonmagnetic layer comprising nonmagnetic powder and binder, or the nonmagnetic organic material support—can be prevented from being affected by heat and deforming in a manner that subsequently compromises running stability. Based on an aspect of the present invention thus configured, it is possible to apply a particulate magnetic recording medium that is useful as a medium for high-capacity data storage to heat-assisted recording.

Although heat-assisted recording is a recording method in which the recorded portion of the magnetic layer is heated by the magnetic head to lower the coercive force Hc and ensure ease of writing, this heating may end up also heating the region in the vicinity of the portion in which information is being recorded, tending to cause thermal fluctuation in adjacent portions. Further, when the recorded portion retains the heat following recording, thermal fluctuation may end up occurring in the recorded portion. Accordingly, it is desirable to rapidly dissipate the heat that has been applied to locally heat the recorded portion without this heat spreading to adjacent regions. Thus, providing a heat-diffusing layer beneath the magnetic layer and promoting diffusion of the heat applied to the magnetic layer are effective.

The magnetic recording medium according to an aspect of the present invention will be described in greater detail below.

Nonmagnetic Organic Material Support

The magnetic recording medium according to an aspect of the present invention is a particulate magnetic recording medium and has a nonmagnetic support comprised of an organic material as a support. A known film can be employed as the nonmagnetic organic material support, such as polyester such as polyethylene terephthalate or polyethylene naphthalate; polyolefin; cellulose triacetate; polycarbonate; aromatic polyamide; aliphatic polyamide; polyimide; polyamide-imide; polysulfone; or polybenzoxazole. Of these, the use of a high-strength support such as polyethylene naphthalate is desirable. In an aspect of the present invention, to prevent by means of a heat-diffusing layer the heat that is applied to the medium during heat-assisted recording from reaching the layer beneath the magnetic layer, it is possible to inhibit or prevent deformation of the support during heat-assisted recording without the use of an expensive heat-resistant resin such as Aramid (registered trademark). Reference can be made to paragraphs 0037 to 0041 of Japanese Unexamined Patent Publication (KOKAI) No. 2010-061763, which is expressly incorporated herein by reference in its entirety, for example, for details regarding nonmagnetic organic material supports that can be used in an aspect of the present invention.

Magnetic Layer

The magnetic layer comprises ferromagnetic powder and binder, as well as may comprise various optional additives. The use of a high Ku magnetic material that is capable of exhibiting high thermal stability even in the form of fine particles to increase the recording density is desirable as the ferromagnetic powder. Examples of high Ku magnetic materials are noble metals such as FePt, rare earths such as NdFeB, nitrides such as $Fe_{16}N_2$, and ferromagnetic ferrites such as hexagonal ferrite and $\epsilon$-iron oxide. However, as set forth above, a high Ku magnetic material will have high coercive force and the writing of information will be difficult. By contrast, recording on the particulate magnetic recording medium of an aspect of the present invention is conducted by heat-assisted recording, so the use of ferromagnetic ferrite powder in the form of a high Ku magnetic material as the magnetic material can achieve both higher density recording and thermal stability, while ensuring ease of writing by heat-assisted recording.

Fine particulate magnetic material that is suitable as the magnetic material of a magnetic recording medium for high-density recording with a particle size of 8 nm to 30 nm is desirably employed as the ferromagnetic powder. A particle size falling within a range of 8 to 20 nm is preferred.

In the present invention, the particle size is a value measured by the following method.

The particles are photographed at 100,000-fold magnification with a transmission electron microscope, for example, a model H-9000 transmission electron microscope made by Hitachi, and printed on photographic paper at an overall magnification of 500,000-fold to obtain a particle photograph. The targeted particles are selected in the particle photograph, the contours of the particles are traced with a digitizer, and the particle size is measured with an image analysis software, for example, KS-400 Carl Zeiss image analysis software. For the powder comprised of gathering particles, the size of 500 particles is measured and the average value of the particle size is adopted as a particle size (average particle size).

In the present invention, the size of the particles of magnetic material or the like (referred to as the "particle size", hereinafter), (1) is given by the length of the major axis of the particle, that is, the major axis length when the particles are acicular, spindle-shaped, cylindrical in shape (with the height being greater than the maximum major diameter of the bottom surface), or the like; (2) is given by the maximum major diameter of the plate surface or bottom surface when the particles are tabular or cylindrical in shape (with the thickness or height being smaller than the maximum major diameter of the plate surface or bottom surface); and (3) is given by the diameter of a circle of equal perimeter when the particles are spherical, polyhedral, or of indeterminate shape, and the major axis of the particle cannot be specified based on the shape. The term "diameter of a circle of equal perimeter" can be obtained by circular projection.

The average particle size of the particles is the arithmetic average of the above particle size and is obtained by measuring 500 primary particles, as set forth above. The term "primary particle" refers to an independent particle that has not aggregated.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a particle for a particle size of definition (1) above, and refers to the thickness or height for definition (2) above. For (3) above, the (major axis length/minor axis length) can be deemed for the sake of convenience to be 1, since there is no difference between the major and minor axes.

When the shape of the particle is specified, for example, as in particle size definition (1) above, the average particle size refers to the average major axis length. For definition (2) above, the average particle size refers to the average plate diameter, with the arithmetic average of (maximum major diameter/thickness or height) being referred to as the average plate ratio. For definition (3), the average particle size refers to the average diameter (also called the average particle diameter).

Shape anisotropy increases in the order of (2), (3), (1). When the easy axis of magnetization is oriented in-plane, choosing to simply increase the shape anisotropy is desirable from the perspective of reducing the particle size. Additionally, when the easy axis of magnetization is oriented perpendicular to the surface for perpendicular recording, it is better that the perspective of the flow orientation of the coating or the like is also taken into account. Thus, the order of (2), (1), (3) becomes desirable. Further, from the perspective of thermal stability, the $\epsilon$-iron oxide described farther below desirably assumes the mode of (3), and is preferably spherical. In measuring the size of the particle, the standard deviation/average value, denoted as a percentage, is defined as the coefficient of variation of the particle size distribution.

From the perspective of thermal stability, the various high Ku magnetic materials described above are desirably employed as the ferromagnetic powder. As a magnetic characteristic of the ferromagnetic powder, the coercive force Hc at 25° C. of the high Ku magnetic material of good thermal stability is normally equal to or higher than 318 kA/m (4,000 Oe), desirably falling within a range of 318 to 1,592 kA/m (4,000 to 20,000 Oe). Magnetic materials having the property of coercive force that decreases as the temperature rises are suited to heat-assisted recording. An example of a particle characteristic that is desirable from this perspective is a high coercive force Hc dependence on temperature. More specifically, the larger the absolute value of the coercive force Hc dependence on temperature as measured by the method set forth farther below (the smaller the value): equal to or less than $(-796 \text{ A/m})/°\text{C}$. $(-10 \text{ Oe}/°\text{C}.)$ is desirable. It is, for example, $(-19,104 \text{ A/m})/°\text{C}$. $(-240 \text{ Oe}/°\text{C}.)$ to $(-796 \text{ A/m})/°\text{C}$. $(-10 \text{ Oe}/°\text{C}.)$, preferably $(-11,940 \text{ A/m})/°\text{C}$. $(-150 \text{ Oe}/°\text{C}.)$ to $(-796 \text{ A/m})/°\text{C}$. $(-10 \text{ Oe}/°\text{C}$.

Even in a high Ku magnetic material, from the perspectives of cost, stability in air, and the like, the use of ferromagnetic ferrite powder such as hexagonal ferrite or $\epsilon$-iron oxide is preferred. In particular, the use of $\epsilon$-iron oxide, which is magnetic powder that is suited to heat-assisted recording because it tends not to be affected by thermal interference, is desirable.

The method of preparation from goethite, the reverse micelle method, and the like are known as methods of preparing $\epsilon$-iron oxide. In an aspect of the present invention, these known methods can be employed to prepare $\epsilon$-iron oxide for use as the ferromagnetic powder in the magnetic layer. Commercially available $\epsilon$-iron oxide can also be employed.

The method of preparing $\epsilon$-iron oxide by the reverse micelle method will be described below as an example.

The preparation of $\epsilon$-iron oxide by the reverse micelle method can comprise:
(1) a step of preparing iron salt particles in the form of a precursor of $\epsilon$-iron oxide (also referred to as "precursor particles" hereinafter);
(2) a step of coating the precursor particles with a sintering inhibitor, desirably by the sol-gel method;
(3) a step of heating and calcination of the precursor particles that have been coated with the sintering inhibitor; and
(4) a step of removing the sintering inhibitor from the surface of the particles of $\epsilon$-iron oxide that have been obtained by converting the precursor particles by heating and calcination.

In step (1), iron salt particles of the precursor can be precipitated out of a micelle solution by the reverse micelle method. Preferably, a surfactant and an organic solvent that is immiscible with water are added to an aqueous solution of a water-soluble salt of iron to form a W/O emulsion, to which an alkali is then added to cause the iron salt to precipitate out. For example, the particle size of the precipitating iron salt can be controlled by means of the mixing ratio of surfactant and water. As set forth farther below, by conducting heating and calcination once the precursor particles have been coated with a sintering inhibitor, sintering of the $\epsilon$-iron oxide particles into coarse particles can be prevented. Accordingly, the particle size of the $\epsilon$-iron oxide particles finally obtained can be controlled primarily by means of the particle size of the iron salt particles that precipitate here.

Examples of the above water-soluble salt are nitrates and chlorides of iron. Examples of the alkali are sodium hydroxide, potassium hydroxide, sodium carbonate, and ammonia water. In the $\epsilon$-iron oxide, some of the Fe can be replaced with another element to control the magnetic characteristics. Examples of elements that can be substituted are Al, Ga, In, Co, Ni, Mn, Zn, and Ti. Such substituted forms of $\epsilon$-iron oxide can be employed as ferromagnetic powder in the magnetic layer in an aspect of the present invention. In the case where a substituted form of $\epsilon$-iron oxide is obtained by the reverse micelle method, it suffices to add a compound of the substitution element (a nitrate, hydroxide, or the like) to the micelle solution in step (1).

Step (2) is a step in which a sintering inhibitor is coated on the surface of the precursor particles prior to heating and calcination to prevent the particles from sintering into coarse particles in step (3). From the perspective of uniformly coating the sintering inhibitor on the surface of the precursor particles, the sintering inhibitor is desirably coated onto the surface of the precursor particles by the sol-gel method.

A Si compound, an Y compound, or the like can be employed as the sintering inhibitor. From the perspectives of the sintering inhibition effect and ease of removal following heating and calcination, it is desirable to coat the precursor particles with a Si oxide. For example, a silane compound such as an alkoxysilane can be added to the solution in which the precursor particles have precipitated in step (1), and silica ($SiO_2$), which is a hydrolysis product of silane compounds, can be adhered to the surface of the precursor particles. The silane compound is preferably in the form of tetraethyl orthosilicate (TEOS), which permits the formation of silica by the sol-gel method.

The precursor particles that have been coated with the sintering inhibitor can be cleaned to remove unreacted material (the above silane compound and the like) from the surface of the precursor particles prior to step (3). The cleaning can be conducted with water, an organic solvent, or a mixed solvent thereof.

The precursor particles that have been coated with the sintering inhibitor as set forth above can, as needed, be processed by removal from the solution, cleaning, drying, pulverizing, and the like, and then subjected to the heating and calcination of step (3). Pulverization can make it possible to achieve uniform calcination and can facilitate removal of the sintering inhibitor following calcination.

The heating and calcination in step (3) can be conducted at an ambient temperature of 500° C. to 1,500° C., for example. By heating and calcination of the precursor particles in the above ambient temperature in air, for example, the precursor particles can be converted to $\epsilon$-iron oxide by an oxidation reaction or the like.

Normally, since the sintering inhibitor remains on the surface of the particles following calcination, step (4) is conducted to remove the sintering inhibitor. A suitable removal method can be selected based on the type of sintering inhibitor. For example, the above silica can be dissolved and removed by the method of immersing the particles in an alkali solution of sodium hydroxide or the like (alkali washing), or with hydrofluoric acid (HF) or the like. From the ease of handling, alkali washing is desirably employed.

Reference can also be made to Examples set forth farther below to prepare $\epsilon$-iron oxide particles by the reverse micelle method mentioned above.

Magnetic Layer

The magnetic layer comprises binder in addition to the ferromagnetic powder. A known binder that is employed in the magnetic layer of particulate magnetic recording media can be employed as the binder in the magnetic layer. Examples of the binder are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs 0029 to 0031 in Japanese Unexamined Patent Publication (KOKAI) No. 2010-24113, which is expressly incorporated herein by reference in its entirety, for details of the binder. A polyisocyanate curing agent may also be employed with the above resins.

Additives can be added to the magnetic layer as needed. Examples of additives are abrasives, lubricants, dispersing agents, dispersion adjuvants, antifungal agents, antistatic agents, oxidation inhibitors, and carbon black. Commercial products can be suitably selected based on the desired properties for use as additives.

Nonmagnetic Layer

In an aspect of the present invention, the magnetic recording medium can comprise a nonmagnetic layer comprising nonmagnetic powder and binder between the nonmagnetic organic material support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs 0036 to 0039 in Japanese Unexamined Patent Publication (KOKAI) No. 2010-24113 for details thereof.

Binders, lubricants, dispersing agents, and the other additives, solvents, dispersion methods, and the like suited to the magnetic layer may be adopted to the nonmagnetic layer. In particular, known techniques for the quantity and type of binder, the quantity and type of additives and dispersing agents employed in the magnetic layer may be adopted thereto. Carbon black and organic powders can be added to the nonmagnetic layer. Reference can be made to paragraphs 0040 to 0042 in Japanese Unexamined Patent Publication (KOKAI) No. 2010-24113 for details thereof.

From the perspective of enhancing running durability, the magnetic layer is desirably of great strength. To that end, it is desirable to employ binder with a high glass transition temperature as the binder in the magnetic layer. By contrast, binder of relatively low glass transition temperature is desirably employed as the binder in the nonmagnetic layer to increase the calendering moldability of the nonmagnetic layer and enhance the smoothness of the magnetic layer surface by calendering. Accordingly, from the perspective of achieving both running durability and calendering moldability, the glass transition temperature of the binder in the magnetic layer is desirably higher than the glass transition temperature of the binder in the nonmagnetic layer. From the perspective of enhancing calendering moldability, the use of a binder with a glass transition temperature of less than 100° C. as the binder in the nonmagnetic layer is desirable. From the perspective of achieving both running durability and calendering moldability, the glass transition temperature of the binder in the nonmagnetic layer is desirably equal to or higher than 30° C. but less than 100° C., preferably equal to or higher than 40° C. and equal to or lower than 90° C., and more preferably, equal to or higher than 50° C. and equal to or lower than 80° C. Additionally, from the perspective of running durability, the glass transition temperature of the binder in the magnetic layer is desirably equal to or higher than 100° C., and preferably equal to or higher than 110° C. From the perspective of the solvent solubility of the binder resin, equal to or lower than 170° C. is desirable and equal to or lower than 160° C. is preferred.

In the present invention, the "glass transition temperature of the binder" refers to the local maximum point of the loss elastic modulus in dynamic viscoelasticity measurement. For example, it is the value measured by the following method.

A binder polymer solution is coated to a film thickness of 30 μm on an aramid base (made by Asahi Kasei Corporation) and dried for 3 hours under vacuum at 140° C. The film is then punched into a size of 3.35 mm×60.0 mm to prepare samples for glass transition temperature measurement. The samples that have been prepared are subjected to dynamic viscoelasticity measurement with a Vibron dynamic viscoelasticity apparatus: Model RHEO-2000 (TOYO BACDWIN), and the inflection point temperature of the loss elastic modulus (E") is adopted as the glass transition temperature.

The heat-diffusing layer described farther below is a layer that can play the role of preventing the heat that is applied during heat-assisted recording from reaching the layer beneath the magnetic layer. To prevent the heat from reaching the nonmagnetic layer, a heat-diffusing layer is desirably provided between the magnetic layer and the nonmagnetic layer. It is preferable to use a binder with a low glass transition temperature (low Tg binder) in the nonmagnetic layer, as set forth above. The lower the glass transition temperature of the binder used in the nonmagnetic layer, the greater the tendency of the nonmagnetic layer to deform. Accordingly, providing a heat-diffusing layer between the magnetic layer and the nonmagnetic layer is effective in cases where the particulate magnetic recording medium according to an aspect of the present invention comprises a nonmagnetic layer containing a low Tg binder. Further, in cases where the heating temperature of the magnetic layer during heat-assisted recording is higher than the glass transition temperature of the binder in the nonmagnetic layer, the nonmagnetic layer will have an even greater tendency to deform during heat-assisted recording. In such cases, as well, it is effective to position a heat-diffusing layer between the magnetic layer and the nonmagnetic layer.

Heat-Diffusing Layer

The heat-diffusing layer that is provided between the nonmagnetic organic material support and the magnetic layer, desirably between the magnetic layer and a nonmagnetic layer, is a layer with greater thermal conductivity than the magnetic layer. The presence of such a layer as a heat-diffusing layer can inhibit or can prevent the heat that is applied to the magnetic layer during heat-assisted recording from reaching the layer beneath the magnetic layer. From the perspective of effectively preventing the layer beneath the magnetic layer from being affected by the heat, to effectively promote heat diffusion, the thermal conductivity of the heat-diffusing layer is desirably equal to or higher than 50 W/(m·K), preferably equal to or higher than 80 W/(m·K). To heat the recorded portion to a desired temperature with less energy during heat-assisted recording, the thermal conductivity of the heat-diffusing layer is preferably equal to or lower than 400 W/(m·K). The thermal conductivity of the magnetic layer is normally equal to or higher than 12 W/(m·K), for example, about 12 to 20 W/(m·K). The thermal conductivity of the nonmagnetic layer is normally less than 10 W/(m·K), for example, about equal to or higher than 3 W/(m·K) and equal to or lower than 9 W/(m·K). The thermal conductivity of the various layers in an aspect of the present invention can be measured by the laser flash method, steady-state heat flow method, hot wire method, or some other known method. The thermal conductivity of the various layers can also be calculated by the method in which calculation is carried out from the thermal conductivity of the materials constituting the various layers and proportions accounted for by the constituent materials. The thermal conductivity in Examples farther below is a value obtained by this method.

The magnetic recording medium according to an aspect of the present invention is a particulate magnetic recording medium. The magnetic layer and the optional nonmagnetic layer are formed as coating layers. To form a heat-diffusing layer without greatly changing the process of manufacturing the particulate magnetic recording medium, the heat-diffusing layer is desirably also formed as a coating layer. Specifically, materials of high heat conductivity (heat-diffusing materials) are mixed with a binder to prepare a coating liquid. The coating liquid can be coated on the surface of the nonmagnetic organic material support or the nonmagnetic layer and dried to form a coating layer in the form of a heat-diffusing layer. From the perspective of the heat-release effect, the heat-diffusing material is desirably a metal material. The use of Cu particles, Ag particles, or the like is preferred. The particle size of the heat-diffusing material is desirably equal to or greater than 5 nm from the perspective of dispersion of the heat-diffusing material. Additionally, when the particle size of the particulate material contained in the heat-diffusing layer is greater than the thickness of the heat-diffusing layer, the particles sometimes protrude from the layer, causing a decrease in the surface smoothness of the medium. Accordingly, a particulate material with a particle size that is less than or equal to the thickness of the heat-diffusing layer is desirably employed as the heat-diffusing material so that particles do not protrude from the heat-diffusing layer. The total thickness of the magnetic recording medium is desirably thin from the perspective of recording capacity, particularly in a tape medium. From this perspective, the thickness of the heat-diffusing layer is desirably equal to or less than 500 nm. Accordingly, the particle size of the heat-diffusing material contained in the heat-diffusing layer is desirably equal to or less than 500 nm. From the perspective of maintaining the surface smoothness of the upper layer, that is, magnetic layer, the coefficient of variation in the particle size distribution of the heat-diffusing material is desirably low (the uniformity of the particle size distribution is desirably high). From this perspective, a heat-diffusing material with a coefficient of variation in particle size distribution of equal to or less than 10% is desirably employed, and equal to or less than 5%, for example, falling within a range of 3 to 5%, is preferred. A heat-diffusing material prepared by a known method, or one obtained as a commercial product, can be employed.

The coating liquid for forming the heat-diffusing layer can be prepared by mixing a heat-diffusing material and binder, and optional solvents, additives such as dispersing agents and lubricants, and the like. Known techniques relating to magnetic layers and nonmagnetic layers can be applied to the binder, lubricant, dispersing agents, and the other additives, solvents, dispersion method, and the like of the heat-diffusing layer.

Layer Structure

As for the thickness structure of the magnetic recording medium according to an aspect of the present invention, the thickness of the nonmagnetic organic material support desirably ranges from 3 to 80 µm. The thickness of the magnetic layer is desirably optimized based on the saturation magnetization of the head employed, the length of the head gap, and the recording signal band, and is normally 10 nm to 150 nm, preferably 20 nm to 80 nm, and more preferably, 30 nm to 100 nm. The magnetic layer may be divided into two or more layers having different magnetic characteristics, and a known configuration relating to multilayered magnetic layer may be applied.

The nonmagnetic layer is, for example, 0.1 to 3.0 µm, desirably 0.3 to 2.0 µm, and preferably, 0.5 to 1.5 µm in thickness. The nonmagnetic layer of the magnetic recording medium of an aspect of the present invention can exhibit its effect so long as it is substantially nonmagnetic. It can exhibit the effect of the present invention, and can be deemed to have essentially the same structure as the magnetic recording medium in the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

From the perspective of obtaining a better heat-release effect, the thickness of the heat-diffusing layer is desirably equal to or greater than 100 nm, preferably falling within a range of 100 to 500 nm.

Backcoat Layer

A backcoat layer can be provided on the surface of the nonmagnetic organic material support opposite to the surface on which the magnetic layer is provided, in an aspect of the present invention. The backcoat layer desirably comprises carbon black and inorganic powder. The formula of the magnetic layer or nonmagnetic layer can be applied to the binder and various additives for the formation of the backcoat layer. The backcoat layer is preferably equal to or less than 0.9 µm, more preferably 0.1 µm to 0.7 µm, in thickness.

Manufacturing Steps

The coating liquid for forming each layer, such as the magnetic layer, the nonmagnetic layer, the heat-diffusing layer and the like, of the magnetic recording medium according to an aspect of the present invention normally comprises at least a kneading step, a dispersing step, and a mixing step to be carried out, if necessary, before and/or after the kneading and dispersing steps. Each of the individual steps may be divided into two or more stages. All of the starting materials employed in an aspect of the present invention, including the ferromagnetic powder, the nonmagnetic powder, the heat-diffusing material, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads and other beads may be employed to disperse the coating liquid for each layer. Dispersing media with a high specific gravity such as zirconia beads, titania beads, and steel beads are suitable for use. The particle diameter and filling rate of these dispersing media can be optimized for use. A known dispersing device may be employed. Reference can be made to paragraphs 0051 to 0057 in Japanese Unexamined Patent Publication (KOKAI) No. 2010-24113 for details of the method of manufacturing a magnetic recording medium.

The particulate magnetic recording medium according to an aspect of the present invention as set forth above can be used in heat-assisted recording. As set forth above, in this field, the application of a particulate magnetic recording medium to heat-assisted recording at a practical level has conventionally been considered impossible. By contrast, according to an aspect of the present invention, the above-described heat-diffusing layer is positioned between the magnetic layer and the nonmagnetic organic material support, permitting the application of a particulate magnetic recording medium to heat-assisted recording. Based on an aspect of the present invention, a magnetic recording medium for use in heat-assisted recording can be practically achieved, and the trilemma of magnetic recording can be overcome in a particulate magnetic recording medium comprising a high Ku magnetic material.

[Magnetic Recording Device and the Magnetic Recording Method]

A further aspect of the present invention relates to:

a magnetic recording device comprising the particulate magnetic recording medium for heat-assisted recording according to an aspect of the present invention and a magnetic recording head for heat-assisted recording; and a magnetic recording method comprising conducting heat-assisted recording with a magnetic head for heat-assisted recording on the particulate magnetic recording medium for heat-assisted recording according to an aspect of the present invention.

Details of the particulate magnetic recording medium that is employed in the magnetic recording method and magnetic recording device of an aspect of the present invention are as set forth above.

The term "magnetic recording head for heat-assisted recording" refers to a magnetic recording head that is capable of forming magnetic bits by applying a recording magnetic field to a recorded portion while locally heating the recording portion of the magnetic layer. The configuration itself is already widely known in this field. A light source that is capable of irradiating a near-field light such as a laser beam can be employed as the heating means. In the present invention, the heating temperature of the magnetic layer during heat-assisted recording is achieved based on the temperature of the surface of the recording portion of the magnetic layer in the course of applying a recording magnetic field. From the perspective of facilitating writing, the heating temperature of the magnetic layer during heat-assisted recording is desirably equal to or higher than 100° C., for example, equal to or higher than 100° C. and equal to or lower than 200° C. By contrast, the glass transition temperature of the binder in the nonmagnetic layer as set forth above is desirably low from the perspective of enhancing calendering moldability, preferably less than 100° C. Additionally, when the glass transition temperature of the binder in the nonmagnetic layer is lower than the heating temperature of the magnetic layer during heat-assisted recording, some measure should be adopted if the nonmagnetic layer is not to be deformed by the heat that is applied to the magnetic layer during heat-assisted recording. By contrast, according to an aspect of the present invention, providing the above heat-diffusing layer can inhibit deformation of the nonmagnetic layer.

In an aspect of the present invention, any magnetic head for heat-assisted recording that has been obtained commercially or prepared by a known method can be employed without limitation. Magnetic heads normally come in the form of recording heads and reproduction heads. To reproduce with high sensitivity a magnetic signal that has been recorded at high density, a reproduction head in the form of a magnetic head containing a magnetoresistive head (MR head) is desirable. A particulate magnetic recording medium comprised of organic materials tends to not warm up as readily as a vapor deposited magnetic recording medium such as an HDD. Accordingly, to cause the desired temperature to reach the recording portion during the application of the magnetic field to the recording portion, it is desirable to begin radiation with a laser beam prior to application of the magnetic field. Additionally, due to the property of organic materials of tending not to warm up and not to cool down readily, according to the particulate magnetic recording medium, it can be anticipated that the energy that is applied to achieve the desired temperature in the recorded portion during heat-assisted recording can be reduced relative to vapor-deposited magnetic recording media, thereby reducing thermal interference with adjacent bits.

In the magnetic recording medium and magnetic recording device according to an aspect of the present invention, in addition to the use of heat-assisted recording, known techniques relating to magnetic recording on particulate magnetic recording media can be applied without limitation.

According to an aspect of the present invention as set forth above, it is possible to overcome the trilemma of magnetic recording by applying heat-assisted recording to a particulate magnetic recording medium and achieve even higher capacity and higher density recording.

EXAMPLES

The present invention will be described in detail below based on specific examples and comparative examples. However, the present invention is not limited to the examples. The terms "part(s)" and "percent" given below are "weight part(s)" and "weight percent". The room temperatures stated below are 25° C.±1° C., and unless specifically stated otherwise, all operations were conducted at room temperature.

Preparation Example 1

$\epsilon$-Iron Oxide Synthesis

[Procedure 1: Preparation of Micelle Solution]

Two types of micelle solution, Micelle Solution I and Micelle Solution II, were prepared by the following method.

(1) Preparation of Micelle Solution I

To 10.46 g of iron (III) sulfate nonahydrate and 123.7 g of cetyltrimethylammmonium bromide were added 207.9 g of pure water followed by 439.8 g of n-octane and 101.2 g of 1-butanol, and the mixture was stirred and dissolved.

(2) Preparation of Micelle Solution II

To 123.7 g of cetyltrimethylammonium bromide were added 178.5 g of 10 percent ammonia water and 439.8 g of n-octane and 101.2 g of 1-butanol, and the mixture was stirred and dissolved.

[Procedure 2: Precipitation of Precursor Particles]

Micelle Solution II was added dropwise to Micelle Solution I with stirring. When the dropwise addition had been completed, stirring of the mixture was continued for 30 minutes.

[Procedure 3: Coating the Precursor Particles with Sintering Inhibitor]

Iron hydroxide $Fe(OH)_2$ precursor particles had precipitated into the mixture obtained in Procedure 2. While stirring the mixture, 48.9 g of tetraethoxysilane (TEOS) was added. Stirring was continued in the same manner for about one day. This caused the TEOS to undergo hydrolysis, coating the surface of the precursor particles in the mixture with silica.

[Procedure 4: Cleaning]

The solution obtained by Procedure 3 was placed in a separating funnel, 200 mL of a 1:1 mixture of pure water and ethanol was added, and the mixture was left standing. When a reddish-brown portion had separated from the remainder, everything but the reddish-brown portion was discarded. This operation was repeated three times. The mixture was then placed in a centrifuge and centrifuged. The precipitate thus obtained was recovered. The recovered precipitate was redispersed with a mixed solution of chloroform and ethanol and centrifuged. The precipitate obtained was recovered.

[Procedure 5: Heating and Calcination]

The precipitate obtained by Procedure 4 was air dried and pulverized in a mortar. Subsequently, a two-hour heat treatment was conducted at an internal furnace temperature of 1,025° C. while feeding in air at 1 L/min with an image furnace made by ULVAC-RIKO. This yielded ε-iron oxide particles coated with a sintering inhibitor in the form of silica.

[Procedure 6: Removing the Sintering Inhibitor]

One gram of the ε-iron oxide particles coated with silica obtained by Procedure 5 was placed in 25 cc of a 5 N sodium hydroxide aqueous solution and processed for 4 hours while applying ultrasound at a temperature of 70° C. Subsequently, the mixture was stirred for a day and a night. This removed the silica from the surface of the ε-iron oxide particles.

Subsequently, water washing and centrifugation were repeatedly conducted and cleaning was performed until the supernatant dropped lower than pH 8. At that point, the product was air dried, yielding ε-iron oxide particles. The fact that the particles obtained were ε-iron oxide was confirmed by powder X-ray diffraction analysis with an X'Pert PRO (radiation source CuKα radiation, voltage 45 kV, current 40 mA) made by PANalytical Corp.

Methods of Evaluating Magnetic Characteristics

In the ε-iron oxide particles obtained in Preparation Example 1, the (residual) coercive force Hc at 25° C. and the saturation magnetization Ms were measured with a vibrating superconducting magnetometer VSM (external magnetic field 4.5 T) made by Tamagawa Seisakusyo Co., Ltd. A temperature control device made by the same company was also used to measure the coercive force Hc at 0° C. and 45° C.

The dependence on temperature of the coercive force was determined by the following method.

Following magnetization at the Curie point (Tc) with a vibrating superconducting magnetometer VSM (external magnetic field 4.5 T) made by Tamagawa Seisakusyo Co., Ltd., the temperature dependence of residual magnetization was determined with a vibrating sample magnetometer VSM-5 made by Toei Industry Co., Ltd. using a temperature controller made by the same company. The temperature at which the residual magnetization went to zero was 235° C. At the Curie point, the coercive force Hc is zero. The coercive force Hc based on temperature was plotted for temperatures of 0° C., 25° C., and 45° C. Based on the results, the least squares method was used to calculate the slope of the line, which was adopted as an index of the dependence of the coercive force on temperature. The coercive force temperature dependence of the ε-iron oxide obtained in Preparation Example 1 was (−1512 A/m)/° C. (−19 Oe/° C.).

The activation volume Vact, (dynamic) coercive force H0, magnetocrystalline anisotropy Ku, and Ku×Vact/kT were obtained by varying the magnetization time with a VSM made by Toei Industry and a magnetizer made by the same company and conducting measurement.

The results obtained from the above evaluation are given in Table 1. Ku×Vact/kT is an indicator of the thermal stability of the magnetic particles. A value of equal to or greater than 60 can indicate high thermal stability. The higher Ku×Vact/kT, the better from the perspective of thermal stability; there is no specific upper limit. For example, magnetic particles exhibiting a high value of about 100 can be employed as the ferromagnetic powder in the magnetic layer. However, the higher the thermal stability of the magnetic particles, the greater the Hc becomes and the more difficult it becomes to write information. According to an aspect of the present invention, the difficulty of writing with such magnetic particles of good thermal stability can be resolved by employing heat-assisted recording.

TABLE 1

| Hc | Ms | H0 | KuVact/kT | Ku | Vact |
|---|---|---|---|---|---|
| 357 kA/m (approximately 4489 Oe) | 1 A·m²/kg (approximately 20 emu/g) | 3180 kA/m (approximately 39947 Oe) | 61 | 0.42 J/cc (approximately 4.2 × 10⁶ erg/cc) | 614 nm³ |

The (dynamic) coercive force H0 at room temperature is given by the value shown in Table 1, which can be thought of as becoming 0 at a Curie point of 235° C. Accordingly, it is better to heat the recorded portion to 150° C. in order to record with a recording magnetic field of 1,194 kA/m (15,000 Oe).

Preparation Example 2

Preparation of Particles (Cu Particles) for the Heat-Diffusing Layer

The following operations were conducted in high-purity $N_2$ gas.

A 0.76 g quantity of $NaBH_4$ was dissolved in 16 mL of water (deoxygenated: equal to or less than 0.1 mg/L) to obtain a reducing agent aqueous solution. To this was admixed an alkane solution obtained by mixing 10.8 g of the aerosol OT (made by Wako Pure Chemicals), 80 mL of decane (made by Wako Pure Chemicals), and 2 mL of oleylamine (made by Tokyo Chemical Industry Co., Ltd.) to prepare reverse micelle solution (I).

To a metal salt aqueous solution obtained by dissolving 0.133 g of copper chloride ($CuCl_2 \cdot 2H_2O$) (made by Wako Pure Chemicals) in 12 mL of water (deoxygenated) was admixed an alkane solution obtained by mixing 5.4 g of aerosol OT (made by Wako Pure Chemicals) and 40 mL of decane (made by Wako Pure Chemicals) to prepare reverse micelle solution (II).

While stirring reverse micelle solution (I) at high speed in an Omni mixer (made by Yamato Science) at 22° C., reverse micelle solution (II) was added all at once. After 10 minutes, while stirring with a magnetic stirrer, the temperature was raised to 50° C. and the mixture was aged for 60 minutes.

A 2 mL quantity of oleic acid (made by Wako Pure Chemicals) was added and the mixture was cooled to room temperature. Following cooling, it was brought out into the air. To destroy the reverse micelle, a mixed solution comprised of 100 mL of water and 100 mL of methanol was added to induce separation into an aqueous phase and an oil phase. Alloy particles were obtained in a dispersed state in the oil phase. The oil phase was washed five times with a mixed solution of 600 mL of water and 200 mL of methanol.

Subsequently, 1,100 mL of methanol was added to induce flocculation and precipitation of the alloy particles. The supernatant was removed and 20 mL of heptane (made by Wako Pure Chemicals) was added to redisperse the alloy particles.

Precipitation and dispersion in the form of precipitation by adding 100 mL of methanol and dispersion by adding 20 mL of heptane were repeated twice. Finally, 5 mL of heptane was added to prepare an alloy particle-containing liquid comprising Pt particles in which the weight ratio of water to surfactant (water/surfactant) was 2. Subsequently, the solvent was replaced with a 6:4 solvent of methyl ethyl ketone ("MEK" hereinafter): cyclohexanone.

Particles photographed by TEM (a transmission electron microscope made by Hitachi Seisakusho: acceleration voltage 300 kV) were measured and statistically processed to obtain the volume average particle diameter and particle size distribution of the particles obtained. As a result, the average particle diameter was 4.2 nm and the coefficient of variation of the particles size distribution was 5 percent.

Preparation Example 3

Preparation of Particles for Heat-Diffusing Layer (Ag Particles)

With the exception that the 0.133 g of copper chloride ($CuCl_2 \cdot 2H_2O$) (made by Wako Pure Chemicals) in the preparation of Cu particles in Preparation Example 2 was replaced with 0.176 g of silver perchlorate ($AgClO_4 \cdot H_2O$) (made by Wako Pure Chemicals), Ag particles were prepared and evaluated in the same manner as in Preparation Example 2. The average particle diameter of the Ag particles obtained was 4.1 nm and the coefficient of variation was 5 percent.

Examples 1 and 2

Preparation of Magnetic Tapes (1) Formula of Magnetic Layer Coating Liquid

| | |
|---|---|
| Magnetic powder: | 100 parts |
| Polyurethane resin (glass transition temperature: 150° C.) Branched chain-containing polyester polyol/ diphenylmethane diisocyanate, —$SO_3Na$ = 400 eq/ton | 15 parts |
| $\alpha$-$Al_2O_3$ (particle size 0.15 μm): | 4 parts |
| Plate-shaped alumina powder (average particle diameter: 50 nm): | 0.5 part |
| Diamond powder (average particle diameter: 60 nm): | 0.5 part |
| Carbon black (particle size: 20 nm): | 1 part |
| Cyclohexanone: | 110 parts |
| Methyl ethyl ketone: | 100 parts |
| Toluene: | 100 parts |
| Butyl stearate: | 2 parts |
| Stearic acid: | 1 part |

(2) Formula of Nonmagnetic Layer Coating Liquid

| | |
|---|---|
| Nonmagnetic inorganic powder: α-Iron oxide Surface treatment agents: $Al_2O_3$, $SiO_2$ Major axis diameter: 0.15 μm Tap density: 0.8 Acicular ratio: 7 Specific surface area by BET method: 52 $m^2/g$ pH: 8 DBP oil absorption capacity: 33 g/100 g | 75 parts |
| Carbon black: DBP oil absorption capacity: 120 mL/100 g pH: 8 Specific surface area by BET method: 250 $m^2/g$ Volatile content: 1.5 percent | 25 parts |
| Polyurethane resin (glass transition temperature: 70° C.): Branched chain-containing polyester polyol/ diphenylmethane diisocyanate, —$SO_3Na$ = 200 eq/ton | 22 parts |
| Phenyl phosphonic acid: | 3 parts |
| Cyclohexanone: | 140 parts |
| Methyl ethyl ketone: | 170 parts |
| Butyl stearate: | 2 parts |
| Stearic acid: | 1 part |

(3) Formula of Heat-Diffusing Layer Coating Liquid

| | |
|---|---|
| Heat-diffusing layer particles (particles indicated in Table 2): | Quantity given in Table 2 |
| Polyurethane resin: Branched chain-containing polyester polyol/ diphenylmethane diisocyanate, —$SO_3Na$ = 200 eq/ton | 22 parts |
| Phenyl phosphonic acid: | 3 parts |
| Cyclohexanone: | 140 parts |
| Methyl ethyl ketone: | 170 parts |
| Butyl stearate: | 2 parts |
| Stearic acid: | 1 part |

(4) Formula of Backcoat Layer Coating Liquid

| | |
|---|---|
| Carbon black (average particle diameter: 25 nm): | 40.5 parts |
| Carbon black (average particle diameter: 370 nm): | 0.5 part |
| Barium sulfate: | 4.05 parts |
| Nitrocellulose: | 28 parts |
| Polyurethane resin (containing $SO_3Na$ groups): | 20 parts |
| Cyclohexanone: | 100 parts |
| Toluene: | 100 parts |
| Methyl ethyl ketone: | 100 parts |

(5) Preparation of Various Layer-Forming Coating Liquids

For each of the magnetic layer coating liquid, nonmagnetic layer coating liquid, backcoat layer coating liquid, and heat-diffusing layer coating liquid of the formulas set forth above, the various components were kneaded for 240 minutes in an open kneader and dispersed in a bead mill (1,440 minutes for the magnetic layer coating liquid and heat-diffusing layer coating liquid, 720 minutes for the nonmagnetic layer coating liquid, and 720 minutes for the backcoat layer coating liquid). To each of the dispersions obtained were added 4 parts of a trifunctional low-molecular-weight polyisocyanate compound (Coronate 3041, made by Nippon Polyurethane Industry Co., Ltd.). The mixture was stirred for 20 minutes and then passed through a filter having an average pore diameter of 0.5 μm. Subsequently, the magnetic layer coating liquid was centrifuged for 30 minutes at a rotational speed of 10,000 rpm in a Himac CR-21D refrigerated centrifuge made by Hitachi High-Tech, and the aggregate was removed and graded.

(6) Preparation of Magnetic Tape

The nonmagnetic layer coating liquid obtained was coated on a polyethylene naphthalate (PEN) support (with an average surface roughness Ra=1.5 nm as measured with an HD2000 made by WYKO) 5 μm in thickness in a manner calculated to yield the thickness indicated in Table 2 upon drying, and then dried at 100° C. to form a nonmagnetic layer. The support stock on which the nonmagnetic layer had been formed was heat treated for 24 hours at 70° C., after which the heat-diffusing layer coating liquid was coated in a manner calculated to yield a dry thickness of 0.5 μm on the surface of the nonmagnetic layer. Subsequently drying was conducted at 100° C. to form a heat-diffusing layer.

Following the above grading, the magnetic layer coating liquid was wet-on-dry coated on the surface of the heat-diffusing layer (Examples 1 and 2) or the surface of the nonmagnetic layer (Comparative Example 1) in a manner calculated to yield a dry thickness of 100 nm upon drying, and dried at 100° C. The backcoat layer coating liquid was coated and dried on the opposite surface of the support from that on which the magnetic layer was positioned, forming a backcoat layer 0.5 μm in thickness.

Subsequently, a surface smoothing treatment was conducted at a temperature of 100° C., a linear pressure of 350 kg/cm, and a rate of 100 m/min with a seven-stage calender comprised only of metal rolls. The product was then slit to one-half inch width to fabricate a magnetic tape.

Evaluation Methods
(1) Test to Confirm the effect of formation of the Heat-Diffusing Layer The optical system shown schematically in FIG. 1 was fabricated. As the laser, a semiconductor laser with a wavelength of 405 nm (CUBE laser made by Coherent.co.jp.) was employed. Laser was expanded to a diameter of 8 mm with a beam expander. A mechanical shutter (VMM-T1 made by UNIBLITZ) was employed as the shutter, and an infinity objective lens (made by OPTEM, at 20-fold magnification, numerical aperture NA=0.6) was employed as the objective lens. The magnetic layer surface temperatures in the regions corresponding to the recorded portions of the magnetic tape of Examples and Comparative Examples were heated to 150° C. set forth above as the temperature required for recording at a recording magnetic field of 1,194 kA/m (15,000 Oe) at room temperature. The laser power required for the above heating was determined by calculating the reflection absorption of the laser beam by the finite difference time domain (FDTD) method with a DeviceMeister (registered trademark)-LP made by Mizuho Information & Research Institute, Inc.

The depths reached by 100° C. and 80° C. (the depth from the surface of the magnetic layer) in the above heating of heat-assisted recording were determined by simulation. Specifically, the spot diameter of the laser was envisioned as being a Gaussian beam system of 390 nm at a strength point of $1/e^2$, that is, 13.5 percent strength. A tape running speed of 7 m/s during recording was assumed, and a three-dimensional thermal conduction equation solved by the finite difference method (explicit method).

(2) Measurement of Thermal Conductivity

The thermal conductivity of each of the above layers was determined from the thermal conductivities and proportions of the constituent materials. The results are given in Table 3.

TABLE 3

| | | Thermal conductivity (W/(m · K)) |
|---|---|---|
| Magnetic layer | | 16 |
| Heat-diffusing layer | Containing Cu particles | 136 |
| | Containing Ag particles | 138 |
| Nonmagnetic layer | | 8.2 |

Evaluation Results

In Examples 1 and 2, the rise in temperature to the prescribed temperatures (100° C. and 80° C.) due to heating during heat-assisted recording was shallower at depth direction positions than in Comparative Example 1. Based on these results, the heat-diffusing layers in Examples 1 and 2 were determined to have inhibited the heat applied due to heating during heat-assisted recording from reaching the layer beneath the magnetic layer.

An aspect of the present invention can be applied in the field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

TABLE 2

| | Thickness of magnetic layer (nm) | Heat-diffusing layer | | Thickness of non-magnetic layer (μm) | Laser power (mW) required for heating the magnetic layer surface temperatures in the regions corresponding to the recorded portions to 150° C. | Position (nm) in the depth direction reached by 100° C. in the heating | Position (nm) in the depth direction reached by 80° C. in the heating |
|---|---|---|---|---|---|---|---|
| | | Particles | Thickness (μm) | | | | |
| Ex. 1 | 100 | Cu particles (70 parts) | 0.5 | 0.5 | 7.0 | 85 | 116 |
| Ex. 2 | 100 | Ag particles (120 parts) | 0.5 | 0.5 | 7.0 | 83 | 113 |
| Comp. Ex. 1 | 100 | — (Without heat-diffusing layer) | — | 1 | 2.8 | 200 | 300 |

What is claimed is:

1. A magnetic recording medium, which is a particulate magnetic recording medium for heat-assisted recording, as well as comprises a magnetic layer comprising ferromagnetic powder and binder on a nonmagnetic organic material support; a heat-diffusing layer of higher thermal conductivity than the magnetic layer between the nonmagnetic organic material support and the magnetic layer; and a nonmagnetic layer comprising nonmagnetic powder and binder between the nonmagnetic organic material support and the heat-diffusing layer.

2. The magnetic recording medium according to claim 1, wherein the heat-diffusing layer is a layer comprising metal particles and binder.

3. The magnetic recording medium according to claim 2, wherein the binder in the magnetic layer has a glass transition temperature that is higher than that of the binder in the nonmagnetic layer.

4. The magnetic recording medium according to claim 2, wherein the binder in the nonmagnetic layer has a glass transition temperature that is lower than a temperature to which the magnetic layer is heated during heat-assisted recording.

5. The magnetic recording medium according to claim 2, wherein the ferromagnetic powder is $\epsilon$-iron oxide.

6. The magnetic recording medium according to claim 1, wherein the binder in the magnetic layer has a glass transition temperature that is higher than that of the binder in the nonmagnetic layer.

7. The magnetic recording medium according to claim 1, wherein the binder in the nonmagnetic layer has a glass transition temperature that is lower than a temperature to which the magnetic layer is heated during heat-assisted recording.

8. The magnetic recording medium according to claim 1, wherein the binder in the nonmagnetic layer has a glass transition temperature of less than 100° C.

9. The magnetic recording medium according to claim 1, wherein the ferromagnetic powder is ferromagnetic ferrite powder.

10. The magnetic recording medium according to claim 1, wherein the ferromagnetic powder has a coercive force at 25° C. of equal to or greater than 318 kA/m.

11. The magnetic recording medium according to claim 1, wherein the ferromagnetic powder is $\epsilon$-iron oxide.

12. The magnetic recording medium according to claim 1, wherein the ferromagnetic powder exhibits a temperature dependency of a coercive force Hc of equal to or less than $(-796 \text{ A/m})/°$ C.

13. A magnetic recording device, comprising:
the magnetic recording medium according to claim 1; and
a magnetic recording head for heat-assisted recording,
said magnetic recording medium being a particulate magnetic recording medium for heat-assisted recording, which comprises a magnetic layer comprising ferromagnetic powder and binder on a nonmagnetic organic material support; a heat-diffusing layer of higher thermal conductivity than the magnetic layer between the nonmagnetic organic material support and the magnetic layer; and a nonmagnetic layer comprising nonmagnetic powder and binder between the nonmagnetic organic material support and the heat-diffusing layer.

14. The magnetic recording device according to claim 13, wherein the magnetic head for heat-assisted recording heats a recording portion on the magnetic layer of the magnetic recording medium to equal to or higher than 100° C.

* * * * *